US007444050B2

(12) United States Patent
Miyadera et al.

(10) Patent No.: US 7,444,050 B2
(45) Date of Patent: Oct. 28, 2008

(54) S-SHAPED CURVED OPTICAL WAVEGUIDE AND OPTICAL DEVICE (75) Inventors: Nobuo Miyadera, Tsukuba (JP); Rei Yamamoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/582,977

(22) Filed: Oct. 19, 2006

(65) Prior Publication Data

US 2007/0036501 A1 Feb. 15, 2007

Related U.S. Application Data (63) Continuation of application No. PCT/JP2004/005536, filed on Apr. 19, 2004.

(51) Int. Cl.
G02B 6/26 (2006.01)
(52) U.S. Cl. ............................ 385/45; 385/132; 385/14; 385/43; 385/50
(58) Field of Classification Search ............ 385/45
See application file for complete search history.

(56) References Cited

U.S. PATENT DOCUMENTS 5,586,209 A * 12/1996 Matsuura et al. .............. 385/45
6,501,886 B1 12/2002 Rankin

FOREIGN PATENT DOCUMENTS

| JP | 04-213407 | 8/1992 |
| JP | 07-159635 | 6/1995 |
| JP | 2000-171652 | 6/2000 |
| JP | 2003-057470 | 2/2003 |
| JP | 2003-315584 | 11/2003 |
| JP | 2004-046032 | 2/2004 |
| JP | 2004-077757 | 3/2004 |

OTHER PUBLICATIONS

G.A. Bogert, et al. "Low-Loss Y-Branch Power Divider", Electronics Letters, vol. 25 No. 25, pp. 1712-1714, 1989.
Chin-Wei Hsu, et al., "Compact Y-Branch Power Splitter based Simplified Coherent Coupling", IEEE, Photonic Technology Letters, vol. 15 No. 8, pp. 1103-1105, 2003.
Kokubun Y., Kouha-Kougaku, "Technology of Light Waves" Published by Kyoritsu Publishing Co., Ltd., p. 250.
Japanese Official Action for Application No. 2003-095168, dated Jul. 30, 2007.
Chinese Official Action for Application No. 2004800427548, dated Sep. 7, 2007.

* cited by examiner

*Primary Examiner*—Frank G Font
*Assistant Examiner*—Eric Wong
(74) *Attorney, Agent, or Firm*—Antonelli, Terry, Stout & Kraus, LLP.

(57) ABSTRACT

The present invention relates to a curved optical waveguide which is free of any axis-deviation structure in the middle of the waveguide and which has a sigmoidal core shape, wherein the curvature thereof at one end is zero and the curvature thereof at the other end is finite (>0) and the use of such a curved optical waveguide permits the reduction of optical loss at the connected portions to the lowest possible level even when it is applied to, for instance, an optical splitter or a directional coupler and the curved optical waveguide of the present invention can provide an optical waveguide which never requires the use of any offset.

16 Claims, 7 Drawing Sheets

S-SHAPED CURVED OPTICAL WAVEGUIDE AND OPTICAL DEVICE

This application is a Continuation application under 35 USC 363 and 35 USC 120 of International (POT) Application Ser. No. PCT1JP20041005536, filed April 19, 2004.

TECHNICAL FIELD

The present invention relates to an S-shaped curved optical waveguide and an optical device using the optical waveguide.

BACKGROUND ART

The demand for the transmission of information has rapidly increased as the recent popularization of personal computers and the recent development of the internet and as a result, there has gradually been used optical transmission system having a high transmission velocity. The optical waveguide has been used in such an optical transmission system as an optical interconnection means. When this optical waveguide (core) has a curved shape such as a sigmoidally curved shape or S-shape, the central axis of the light-propagation mode causes a deviation with respect to the geometrical central axis of the core at the sigmoidally curved portions whose curvature is discontinuously changed and this in turn results in the generation of an optical loss. It would be necessary for the reduction of this optical loss to form a portion (offset) having an axially deviated structure (axis-deviation structure), wherein the central axis of the core is deviated, in a part of the sigmoidally curved region. However, the extent of axis-deviation should be determined depending on the refractive indexes of the core and the clad as components of such an optical waveguide, the dimension of the core and the wavelength of light passing through the same and also due to production tolerance, it is quite difficult to establish any optimum axis-deviation structure and this leads to the generation of an optical loss. Accordingly, it would generally be preferred that the optical waveguide is free of any such axis-deviation structure. Moreover, this technique likewise suffers from a problem such that it is impossible to form an axis-deviation structure having any degree of axis-deviation optimum for wavelengths falling within a wider range since the extent of axis-deviation should be determined depending on the wavelength of light.

In this connection, the general explanation of such an axis-deviation structure for the optical waveguide is disclosed in literature (see, for instance, "Kouha-Kougaku (Technology of Light Waves)", KOKUBUN Yasuo, published by Kyoritsu Publishing Co., Ltd., p. 250).

In this respect, there have been known functions in some CAD softwares, which are used for creating a curved shape of optical waveguides and the like. By way of example, one of the curved shapes prepared by the function has a shape that is formed by connecting two circular arcs which have a radius of curvature equal to R so that the directions of two circular arcs opposite to one another (hereunder referred to as "arc-connected shape"). In such an arc-connected shape, the curvature thereof is discontinuously changed at the connected point and therefore, it is necessary to form an axis-deviation structure at the connected point of these arcs as has been described above (see, FIG. 5D).

In addition, there has also been known a shape depicted using the following cosine function (in the CAD software, this is referred to as "S-bent cosine shape") and it is not necessary, in this shape, to arrange the foregoing axis-deviation structure in the middle of the curve:

$$y = \frac{1}{2}(1 - \cos\pi z)$$

However, the curvatures at the both ends of an optical waveguide having an arc-connected shape are finite and accordingly, the optical waveguide having such an arc-connected shape should be connected to a linear optical waveguide through an axis-deviation structure incorporated into the former (see FIG. 5C).

Furthermore, in case of an optical waveguide having such a shape which makes use of the following sine function (in the CAD software, this is referred to as "S-bent sine shape"), it is not necessary to arrange the foregoing axis-deviation structure in the middle of the curve and the radius of curvature thereof is infinite (or the curvature is equal to zero) at the both ends thereof, in other words, when connecting the optical waveguide having such a shape to a linear optical waveguide, the central axis of the former is completely in agreement with that of the latter and therefore, the connection of these waveguides never requires the use of any axis-deviation structure at all (FIG. 5B):

$$y = z - \frac{1}{2\pi}\sin 2\pi z$$

DISCLOSURE OF THE INVENTION

When an optical waveguide is used for constituting an optical splitter and the like (see, for instance, FIG. 3), two separate optical waveguides are connected to form an optical waveguide branched at one end thereof. In this case, when the distance between these two optical waveguides can ideally be reduced to a level as small as possible (infinitely small distance) at the end to be connected (for instance, portion D shown in FIG. 4A), each of these two optical waveguide branches can be connected to an optical waveguide whose both ends are linear (the curvature thereof is zero) such as those having an S-bent sine shape and this is effective since it permits the reduction of any possible optical loss at the connected portion. However, it is quite difficult to connect these two optical waveguide branches while maintaining such an infinitely small distance between these waveguide branches in a high yield or probability because of the limit peculiar to the production technique and there is, under the present conditions, a considerably large space between the two optical waveguide branches at the branched portion in which these two waveguide branches are connected. For this reason, the connection of such an optical waveguide with such a linear optical waveguide would results in the generation of a significant optical loss at the connected portion. In other words, when connecting the same with a linear optical waveguide whose mode center does not internally cause any axis-deviation, the resulting connection would result in the generation of an optical loss. In this respect, it is suitable to use an S-bent cosine or an arc-connected shape (the curvature at the end >0) as a sigmoidal curve to thus reduce these optical losses. On the other hand, it is preferred that at the other end (for instance, portion E shown in FIG. 4A), such an optical splitter is in a linear type optical waveguide (the curvature thereof is zero) since the splitter can be connected to a linear optical waveguide or an optical fiber without causing optical loss. Moreover, when connecting this end with the subsequent branched portion (such as the portion represented by F in FIG. 4B) and when using an S-bent cosine or an arc-connected shape as a sigmoidal curve, the resulting mode shape becomes asymmetric and therefore, the branching ratio of the resulting optical splitter may vary depending on the wavelength used. A similar problem may likewise arise when an optical waveguide constitutes a directional coupler. As has been described above, all of the optical waveguides having the foregoing shapes conventionally used never permit the reduction of the optical loss at the both ends thereof to be connected and/or the elimination of any wavelength-dependency of the resulting optical devices.

More specifically, the both ends of either the optical waveguide having an arc-connected shape or the optical waveguide having an S-bent cosine shape have finite curvatures (curvature >0) and accordingly, optical losses would be generated at the portions (such as the portions represented by E in FIG. 4A and represented by F in FIG. 4B) to be linearly connected to the end sides of the optical splitter discussed above, or the resulting optical splitter would have an unsatisfactory branching ratio. On the other hand, these two optical waveguides have a space between them at the side connected to the branched portion (the portion D in FIG. 4A) and therefore, the optical waveguides result in increased optical losses when the optical waveguides are those constituted by the S-bent sine-shaped ones whose both ends are linear (the curvature thereof are zero).

Accordingly, it is an object of the present invention to provide an optical waveguide having a specific shape, in which it is not necessary to arrange axis-deviation structures in the connected portions at the both ends thereof even when it is used as an optical splitter or a directional coupler; which permits the reduction of optical loss to the lowest possible level; and in which any axis-deviation structure must not be arranged in the course of the curved area thereof.

Accordingly, the present invention herein provides a curved optical waveguide which has a sigmoidal core shape and which is free of any axis-deviation structure in the middle of the waveguide, wherein the curvature thereof at one end is zero and the radius of curvature thereof at the other end is finite (>0).

Figure 5:
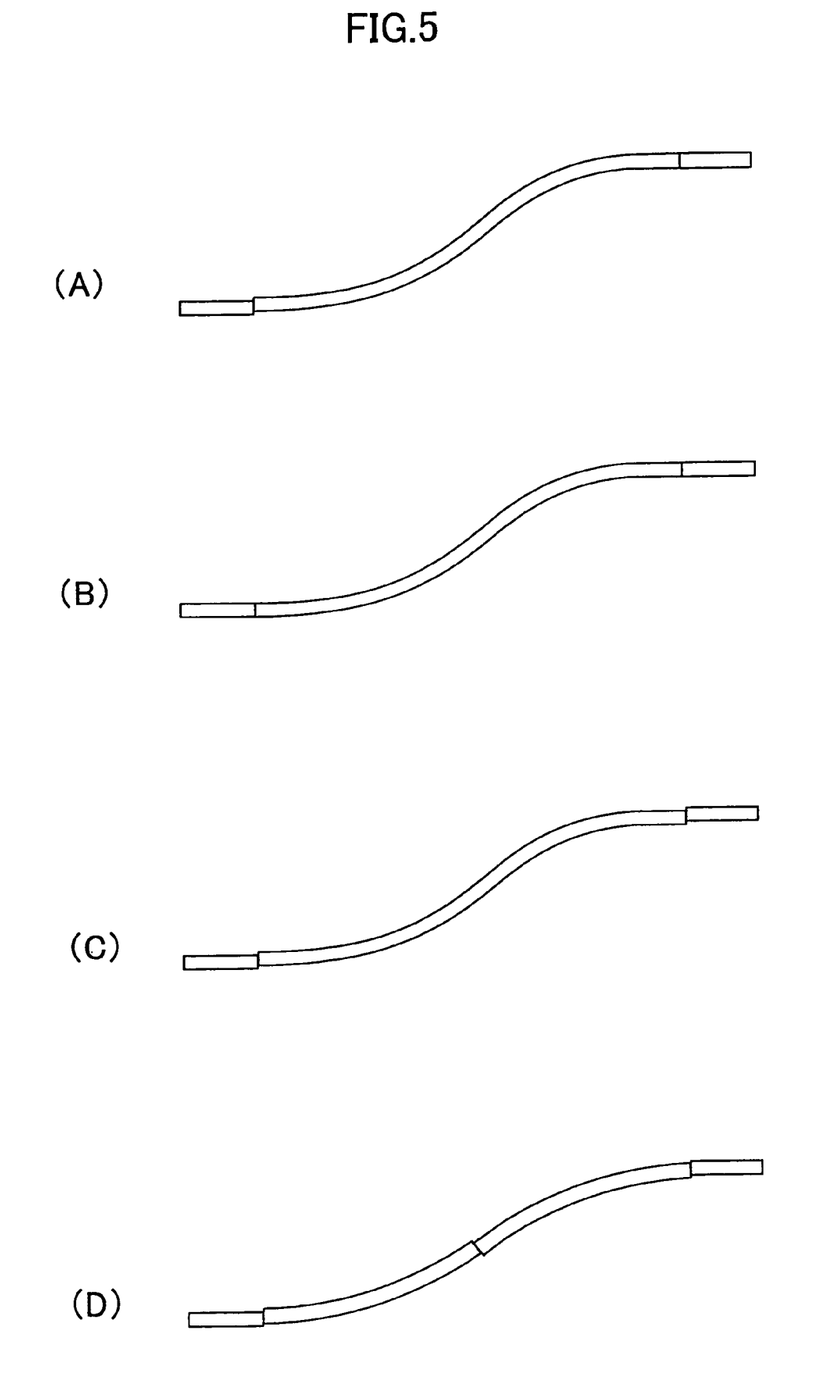
FIG. 5A is a diagram showing a curved optical waveguide according to the present invention.
FIG. 5B is a diagram showing a conventional curved optical waveguide having an S-bent sine shape.
FIG. 5C is a diagram showing a conventional curved optical waveguide having an S-bent cosine shape.
FIG. 5D is a diagram showing a conventional curved optical waveguide having an arc-connected shape.

This curved optical waveguide is one having such properties that an axis-deviation structure should be positioned only at one end thereof when linear optical waveguides are connected on the both ends thereof (see FIG. 5).

Moreover, the present invention further provides a mask used for the production of a curved optical waveguide which is free of any axis-deviation structure in the middle of the waveguide and which has a sigmoidal core shape, wherein the curvature thereof at one end is zero and the curvature thereof at the other end is finite (>0).

In case of a branched optical waveguide which comprises two optical waveguide branches and a connected portion, any excess optical loss at the branched portion can rather be controlled to a low level when using optical waveguide branches each having a structure whose mode center undergoes an axis-deviation toward the space between these two optical waveguide branches, at the branched portion or the connected portion of these branches. In other words, the central axes of the light-propagation modes of these two sigmoidal optical waveguides each undergo deviation towards the interior thereof and therefore, the sigmoidal optical waveguides can be connected to the branched portion while maintaining the optical loss generated at the portion to a low level even when arranging the both sigmoidal optical waveguides with a wider space. In this way, the arrangement of these two sigmoidal optical waveguides at such a wider distance would permit not only the reduction of adverse effect by the scatter in the structures and characteristics of the produced branched portions, but also the reduction of the probability of any insufficiency in the embedding, with a clad material, of the portions having a narrow width. When connecting the sigmoidal optical waveguide with the branched portion of such an optical splitter, it would be quite effective that the sigmoidal optical waveguide has a curved shape whose curvature is finite. On the other hand, such a sigmoidal optical waveguide is connected with a linear optical waveguide or an optical fiber at the other end thereof and accordingly, it is effective for the former to have a curvature of zero at the end thereof. In addition, when the sigmoidal optical waveguide is, for instance, used for the construction of a splitter having a multi-stage tree-like structure, it is likewise effective for the sigmoidal optical waveguide connected to the input of the secondary branched portion to have a curvature of zero at the end thereof.

BRIEF DESCRIPTION OF THE DRAWINGS

FIGS. 5A to 5D are diagrams each showing the connected portion of a curved optical waveguide and linear optical waveguides at the both ends of the former. More specifically.

Reference symbols and reference numerals used in the foregoing figures have meanings specified below:

A: Width of branching; B: Core width; D: Connected portion of the output end of a branching member and two sigmoidal curved optical waveguides, which constitute an optical splitter; E: Connected portion of a sigmoidal curved optical waveguide and a linear optical waveguide; F: Connected portion of the input end of a branching member and a sigmoidal curved optical waveguide; 1 to 14: Curved optical waveguides according to the present invention; 20, 30: V-Shaped groove-forming region; 21, 31: V-Shaped groove; 25, 26: Groove; 41 to 44: Core; 50 Clad; 100: Optical waveguide-forming region; 200: V-Shaped groove-carrying optical waveguide substrate for optical splitters.

BEST MODE FOR CARRYING OUT THE INVENTION

As has been discussed above, the optical waveguide having an S-shaped core according to the present invention is a curved optical waveguide which is free of any axis-deviation structure in the middle of the same and whose core has a sigmoidal shape, wherein the curvature of the optical waveguide at one end is zero and the curvature thereof at the other end is finite (>0). Such a shape of the sigmoidally curved optical waveguide can be derived using functional equations representing a variety of curves. In this connection, the expression "the curvature is zero" at one end of the optical waveguide on the side thereof to be connected to the branched portion (or branching member) means that the curvature thereof is asymptotic to zero to thus result in causing almost no optical loss (on the order of 0.1 dB) due to the deviation of the central axis of the light-propagation mode from the geometrical central axis of the core, when connecting the optical waveguide with a linear optical waveguide.

In this specification, the term "axis-deviation structure" means such a structure that the central line of the optical waveguide core is in a discontinuous condition.

More specifically, one example thereof is a curved optical waveguide having a shape represented by the following equation (1):

$$y = \frac{1}{\left(f(1) + \frac{2}{3\pi}\right)} \left[\frac{2}{3\pi}\left\{1 - \sin\left[\frac{\pi}{2}(3Z+1)\right]\right\} + f(z)\right] \quad (1)$$

In the foregoing equation, y and z represent coordinate axes perpendicular to one another in a plane on which the optical waveguide is positioned; f(z) is a continuous function of z and satisfies f(0)=0, f'(0)=0, f''(0)=0, f(1)≠−2/3π, f'(1)=1, and f''(1)=0; f'(z) is the first differential of the function f(z) with z, and f''(z) is the second differential of the function f(z) with z.

In the equation (1), the coordination system is normalized in such a manner that the origin thereof situates at a point specified by z=0 and y=0, and the end point thereof situates at a point specified by z=1 and y=1, but the coordination system may, if necessary, be extended or contracted towards the y or z direction.

Moreover, a specific example of the f(z) function includes one represented by the following equation (3):

$$f(z) = \frac{1}{2}\left[z - \frac{1}{\pi}\sin \pi z\right] \quad (3)$$

In respect of equation (3), $$f'(z) = \frac{1}{2}[1 - \cos \pi z],$$

$$f''(z) = \frac{\pi}{2}\sin \pi z$$

and thus, the following relations are established: f(0)=0, f'(0)=0, f''(0)=0, f(1)=½(≠−2/3π), f'(1)=1, and f''(1)=0.

More specifically, one of preferred embodiments of the curved optical waveguides according to the present invention is one represented by the following function defined by the following equation (2) derived from the foregoing two $$y = \frac{1}{\frac{1}{2} + \frac{2}{3\pi}}\left[\frac{z}{2} + \frac{2}{3\pi} - \frac{2}{3\pi}\sin\left[\frac{\pi}{2}(3z+1)\right] - \frac{1}{2\pi}\sin[\pi z]\right] \quad (2)$$

equations (1) and (3):

In the curved optical waveguide having the shape defined by the foregoing function, the curvature thereof is continuously changed and therefore, it is not necessary to arrange any axis-deviation structure in the middle of the optical waveguide. As a result, the curvature of the optical waveguide at one end is zero and the curvature thereof at the other end is finite (>0).

The curved optical waveguide of the present invention is suitably used for connecting the same, at its end having a curvature of zero, not only with a linear optical waveguide, but also with the coupled portion of a branched structure (in case of 1×2 splitter, the 1 ch side). In respect of this connected portion, the scatter in the characteristic properties between the products thus prepared is not large as compared with that observed when such connected portions are prepared using the conventional curved optical waveguide which requires the use of an axis-deviation structure and accordingly, the desired optical waveguides can be produced in a good yield. Furthermore, the optical waveguide thus obtained can effectively be operated over a wider wavelength range.

On the other hand, the curved optical waveguide of the present invention is suitably used for connecting the same, at its end having a finite curvature, not only with a curved optical waveguide, but also with the branched portion of a branched structure An case of 1×2 splitter, the 2 ch side). In this connected portion, the quantity of light leaked through the center of the base of the branched portion can be reduced even when the distance between the branches at the base of the branched portion is set at a finite level to thus reduce any excess optical loss at the branched portion.

When an input optical waveguide and an output optical waveguide, which are arranged in a parallel relation, do not have linear shapes identical to one another, the foregoing S-shaped curved optical waveguide can be used for connecting these optical waveguides. Moreover, these S-shaped curved optical waveguides can be used for connecting a plurality of input optical waveguides and a plurality of output optical waveguides, which are arranged in a parallel relation, but whose pitches are different from one another. The S-shaped curved optical waveguide can be used in such a construction that the waveguide is joined with a reflection plane.

When connecting the curved optical waveguide of the present invention with another optical waveguide or an optical fiber, it would be sufficient that they are optically connected to one another and they do not have such a construction that the cores of these optical members are directly connected to one another.

Examples of optical devices, to which the curved optical waveguide of the present invention can be applied, include an optical splitter, a directional coupler, an optical coupler, an optical coupling/branching device, an optical multiplexer/demultiplexer, a light transmission module, a light-receiving module, a light transmission/receiving module, an optical switch, an optical modulator, an optical filter, an optical deflector, an optical dispersion-compensation device, an optical add/drop module, and an optical cross-connection.

The curved optical waveguide of the present invention can be prepared using a curved optical waveguide-preparing mask which carries a pattern for transferring a sigmoidal core shape which is free of any axis-deviation structure in the middle of the same, wherein the curvature of the pattern at one end is zero and the curvature thereof at the other end is finite (>0).

Preferably, there is depicted, on the foregoing curved optical waveguide-preparing mask, a pattern depicted according to a function represented by the following equation (1):

$$y = \frac{1}{\left(f(1) + \frac{2}{3\pi}\right)} \left[\frac{2}{3\pi}\left\{1 - \sin\left[\frac{\pi}{2}(3z+1)\right]\right\} + f(z)\right] \quad (1)$$

In the foregoing equation, y and z represent coordinate axes perpendicular to one another in a plane on which the optical waveguide is positioned; f(z) is a continuous function of z and satisfies $f(0)=0$, $f'(0)=0$, $f''(0)=0$, $f(1) \neq 2/3\pi$, $f'(1)=1$, and $f''(1)=0$; $f'(z)$ is the first differential of the function $f(z)$ with z, and $f''(z)$ is the second differential of the function $f(z)$ with z. The foregoing function may, if necessary, be extended or contracted towards the y and/or z direction prior to the practical use.

More preferably, the foregoing equation (1) is a continuous function of a variable z or a function represented by the following equation (2), in which the function f(z) is represented by the following equation (3):

$$f(z) = \frac{1}{2}\left[z - \frac{1}{\pi}\sin \pi z\right] \quad (3)$$

$$y = \frac{1}{\frac{1}{2} + \frac{2}{3\pi}} \left[\frac{z}{2} + \frac{2}{3\pi} - \frac{2}{3\pi}\sin\left[\frac{\pi}{2}(3z+1)\right] - \frac{1}{2\pi}\sin[\pi z]\right] \quad (2)$$

The curved optical waveguide of the present invention can be prepared according to the same known procedures used above for producing the conventional curved optical waveguide except for using the foregoing mask. For instance, a layer of a core material (as will be discussed later) is formed on a clad, a layer of a light-sensitive resist is formed on the layer of the core material, followed by exposing the resist layer to light rays through the mask, developing the light-exposed resist layer to thus form a resist layer having a pattern corresponding to the curved optical waveguide of the present invention and then forming a core having the shape of the curved optical waveguide of the present invention by the use of a means such as etching. In this respect, any known material can be used as the foregoing material for forming the mask.

The materials used for forming the core and the clad of the curved optical waveguide according to the present invention may be various kinds of materials, for instance, inorganic materials such as glass and semiconductor materials and organic materials such as resins, but preferably used herein include polymers such as resins since they can easily be processed by, for instance, a dry etching technique within a short period of time. In this connection, the clad of the optical waveguide may partially or completely be constituted by an air layer. Such polymers usable herein may be any one and specific examples thereof include polyimide type resins (such as polyimide resins, poly(imide-isoindolo-quinazoline-dione-imide) resins, polyetherimide resins, polyether-ketone resins, and polyesterimide resins), silicone type resins, acrylic resins, polystyrenic resins, polycarbonate type resins, polyamide type resins, polyester type resins, phenolic resins, poly(quinoline) type resins, poly(quinoxaline) type resins, poly(benzoxazole) type resins, poly(benzothiazole) type resins, poly(benzimidazole) type resins, and resins used for photo-bleaching (polysilanes such as those disclosed in Japanese Un-Examined Patent Publication 2001-296438, silicone resins containing nitron compounds, poly(methyl meth-acrylate) containing DMAPN {(4-N,N-dimethyl-aminophenyl)-N-phenyl-nitron}, dye polymers, polyimide resins or epoxy resins containing nitron compounds, and hydrolyzable silane compounds such as those disclosed in Japanese Un-Examined Patent Publication No. 2000-66051). The foregoing resins may be those containing fluorine atoms. Such polymers preferably used herein are, for instance, polyimide resins because of their high glass transition point (Tg) and excellent heat resistance and particularly preferably used herein are fluorine atom-containing polyimide type resins among others because of their excellent transmittance and refractive index characteristics.

Examples of fluorine atom-containing polyimide type resins are fluorine atom-containing polyimide resins, fluorine atom-containing poly(imide-isoindolo-quinazolne-dione-imide) resins, fluorine atom-containing polyetherimide resins, and fluorine atom-containing poly(amide-imide) resins.

A solution containing a precursor for the foregoing fluorine atom-containing polyimide type resin can be prepared by the reaction of a tetracarboxylic acid di-anhydride with a diamine in a polar solvent such as N-methyl-2-pyrrolidone, N,N-dimethyl-acetamide, γ-butyrolactone, or dimethylsulfoxide. Fluorine atoms may be present in either of the foregoing tetracarboxylic acid di-anhydride and diamine or both of them.

Moreover, the solution containing the precursor of the foregoing polyamide type resin free of any fluorine atom can be prepared by the reaction of a tetracarboxylic acid di-anhydride free of any fluorine atom with a diamine likewise free of any fluorine atom in a polar solvent such as N-methyl-2-pyrrolidone, N,N-dimethyl-acetamide, γ-butyrolactone, or dimethylsulfoxide.

Examples of fluorine atom-containing acid di-anhydrides are (trifluoro-methyl)pyromellitic acid di-anhydride, di-(trifluoromethyl)pyromellitic acid di-anhydride, di-(hepta-fluoropropyl)pyromellitic acid di-anhydride, pentafluoro-ethyl pyromellitic acid di-anhydride, bis-[3,5-di-(trifluoromethyl)phenoxy]pyromellitic acid di-anhydride, 2,2-bis(3,4-dicarboxy-phenyl)hexafluoropropane di-anhydride, 5,5'-bis(trifluoromethyl)-3,3',4,4'-tetracarboxy-biphenyl di-anhydride, 2,2',5,5'-tetrakis(trifluoromethyl)-3,3',4,4'-tetracarboxy-biphenyl di-anhydride, 5,5'-bis(trifluoromethyl)-3,3',4,4'-tetracarboxy-diphenyl ether di-anhydride, 5,5'-bis(tri-fluoromethyl)-3,3',4,4'-tetracarboxy-benzophenone di-anhydride, bis-[(trifluoro-methyl)-dicarboxy-phenoxy] benzene di-anhydride, bis-[(trifluoromethyl)dicarboxy-phenoxy](trifluoromethyl)benzene di-anhydride, bis(dicarboxy-phenoxy)(trifluoro-methyl)benzene di-anhydride, bis(dicarboxy-phenoxy)-bis(trifluoromethyl)benzene di-anhydride, bis (dicarboxy-phenoxy)-tetrakis(trifluoromethyl)benzene di-anhydride, 2,2-bis[4-(3,4-dicarboxy-phenoxy)phenyl] hexafluoro-propane di-anhydride, bis[(trifluoromethyl)dicarboxy-phenoxy]biphenyl di-anhydride, bis-[(trifluoromethyl)dicarboxy-phenoxy]bis(trifluoromethyl)biphenyl di-anhydride, bis[(trifluoromethyl)dicarboxy-phenoxy] diphenyl ether di-anhydride and bis-(dicarboxy-phenoxy)-bis(trifluoromethyl)biphenyl di-anhydride.

Examples of fluorine atom-containing diamines are 4-(1H,1H,11H-eicosa-fluoro-undecanoxy)-1,3-diaminobenzene, 4-(1H,1H-perfluoro-1-butanoxy)-1,3-di-aminobenzene, 4-(1H,1H-perfluoro-1-heptanoxy)-1,3-diaminobenzene, 4-(1H,1H-perfluoro-1-octanoxy)-1,3-diaminobenzene, 4-pentafluoro-phenoxy-1,3-diamino-benzene, 4-(2,3,5,6G-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H,2H-perfluoro-1-dodecanoxy)-1,3-diaminobenzene, 2,5-diaminobenzo-trifluoride, bis(trifluoromethyl)phenylene-diamine, diamino-tetra-(trifluoromethyl)benzene, diamino-(pentafluoro-ethyl)benzene, 2,5-diamino-(perfluoro-hexyl)benzene, 2,5-diamino-(perfluoro-butyl)benzene, 2,2'-bis(trifluoromethyl)-4,4'-di-amino-biphenyl, 3,3'-bis(trifluoromethyl)-4,4'-diamino-biphenyl, octafluoro-benzidine, 4,4'-diamino-biphenyl ether, 2,2-bis(p-aminophenyl)hexafluoropropane, 1,3-bis(anilino)hexafluoropropane, 1,4-bis-(anilino)octafluoro-butane, 1,5-bis-(anilino)decafluoro-pentane, 1,7-bis(anilino)tetradecafluoro-heptane, 2,2'-bis(tri-fluoromethyl)-4,4'-diamino-diphenyl ether, 3,3'-bis(trifluoromethyl)-4,4'-diamino-diphenyl ether, 3,3',5,5'-tetrakis(trifluoromethyl)-4,4'-diamino-diphenyl ether, 3,3'-bis(trifluoromethyl)-4,4'-diamino-benzophenone, 4,4'-diamino-p-terphenyl, 1,4-bis-(p-aminophenyl)benzene, p-bis(4-amino-2-trifluoromethyl-phenoxy)benzene, bis-(amino-phenoxy)-bis(trifluoromethyl)benzene, bis(amino-phenoxy)-tetrakis(trifluoromethyl)benzene, 2,2-bis[4-(4-aminophenoxy)phenyl]hexafluoropropane, 2,2-bis[4-(3-aminophenoxy) phenyl]hexafluoropropane, 2,2-bis[4-(2-aminophenoxy)phenyl]hexafluoropropane, 2,2-bis[4-(4-aminophenoxy)-3,5-dimethyl-phenyl]hexa-fluoropropane, 2,2-bis[4-(4-aminophenoxy)-3,5-di-trifluoromethyl-phenyl]hexa-fluoropropane, 4,4'-bis(4-amino-2-trifluoromethyl-phenoxy)biphenyl, 4,4'-bis(4-amino-3-trifluoromethyl-phenoxy)biphenyl, 4,4'-bis(4-amino-2-trifluoromethyl-phenoxy)diphenyl-sulfone, 4,4'-bis(3-amino-5-trifluoromethyl-phenoxy)diphenyl-sulfone, 2,2-bis[4-(4-amino-3-trifluoromethyl-phenoxy)phenyl]hexafluoropropane, bis[(trifluoromethyl)amino-phenoxy]biphenyl, bis{[(trifluoromethyl)amino-phenoxy]phenyl}hexafluoropropane, and bis{2-[(amino-phenoxy)phenyl]hexa-fluoro-isopropyl}benzene.

The aforementioned tetracarboxylic acid di-anhydrides and the foregoing diamines may be used as a corresponding mixture of at least two of them, respectively. The precursor of a polyimide type resin used in the foregoing precursor solution may be those having light-sensitive properties.

The solution containing such a precursor of a polyimide type resin is applied onto the surface of a substrate by a method such as one which makes use of a spinner or a printing method and then cured by subjecting the coated layer to a heat-treatment at a final temperature ranging from 200 to 400° C. to thus form a polyimide type resin film.

EXAMPLE

The present invention will hereunder be described in more detail with reference to the following Examples, but the scope of the present invention is not restricted to these specific Examples at all.

Example 1

The excess optical loss generated at the curved portion of the optical waveguide of the present invention was estimated according to the following method (the wavelengths of the incident light rays used: 1.31 μm and 1.55 μm).

The excess losses of an optical waveguide (as shown in FIG. 5A) assembled by connecting linear optical waveguides to the both ends of the curved optical waveguide according to the present invention and having a curved shape represented by the foregoing formula (2) were found to be −0.004 dB (in case of the incident light having a wavelength of 1.31 μm) and −0.083 dB (in case of the incident light having a wavelength of 1.55 μm). On the other hand, those observed for an optical waveguide (as shown in FIG. 5C) assembled by connecting linear optical waveguides to the both ends of a conventional S-bent cosine-shaped curved optical waveguide were found to be −0.009 dB (in case of the incident light having a wavelength of 1.31 μm) and −0.028 dB (in case of the incident light having a wavelength of 1.55 μm). These results indicate that the excess losses of these two kinds of optical waveguides are almost identical to one another. In this connection, the excess loss was calculated according to the beam-propagation method (BPM).

Figure 1:
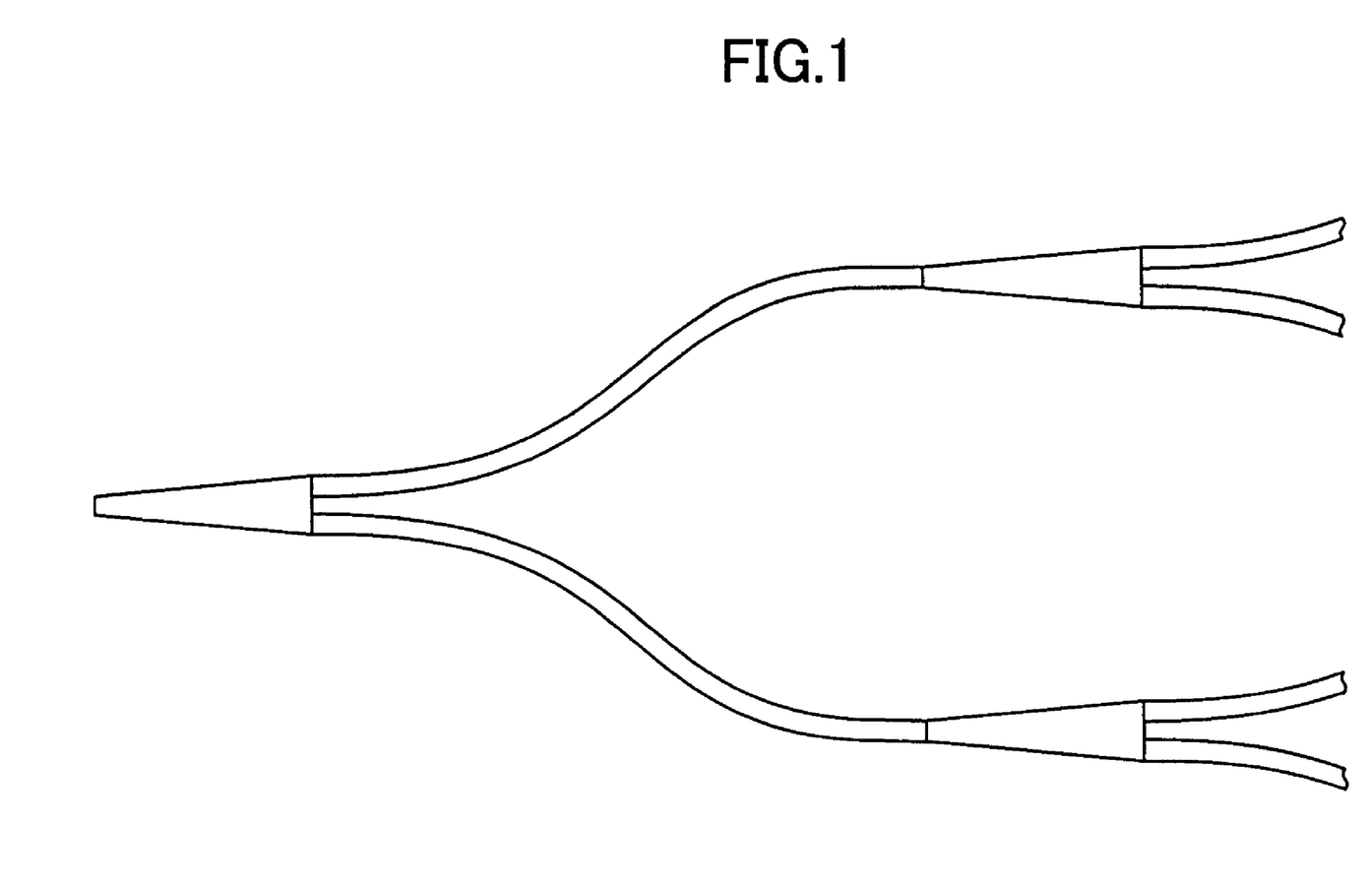
FIG. 1 is a diagram showing an embodiment of the optical splitter which comprises a curved optical waveguide according to the present invention incorporated therein.
Figure 2:
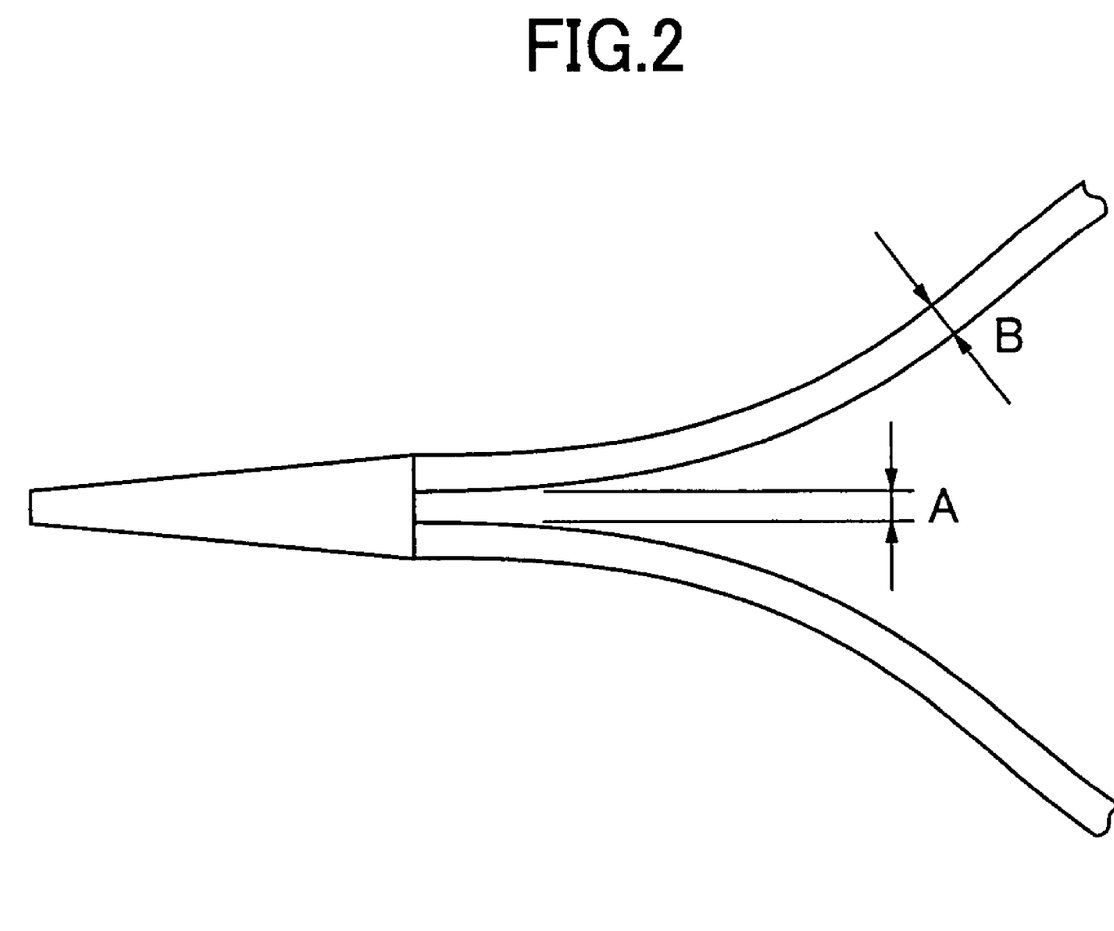
FIG. 2 is an enlarged view showing the branched portion of the optical splitter shown in FIG. 1.

Incidentally, the branching width A and core width B appearing in FIG. 2 are as follows. The curved optical waveguide as shown in FIG. 1 has a curved shape specified by the function represented by the foregoing equation (2).

Branching Width A: 3.5 μm
Core Width B: 6.5 μm

Figure 3:
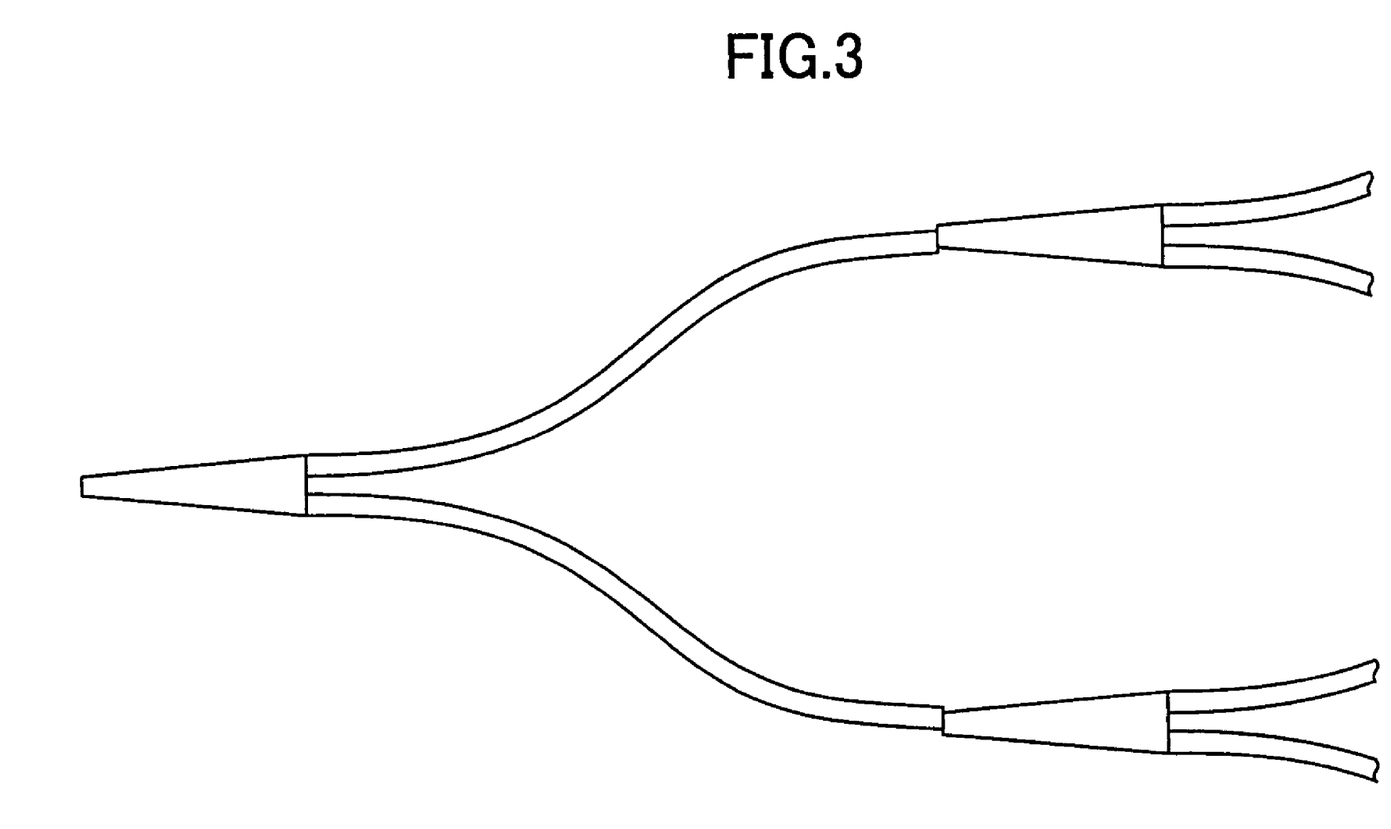
FIG. 3 is a diagram showing an optical splitter which makes use of a conventional S-bent cosine type curved optical waveguide.
Figure 4:
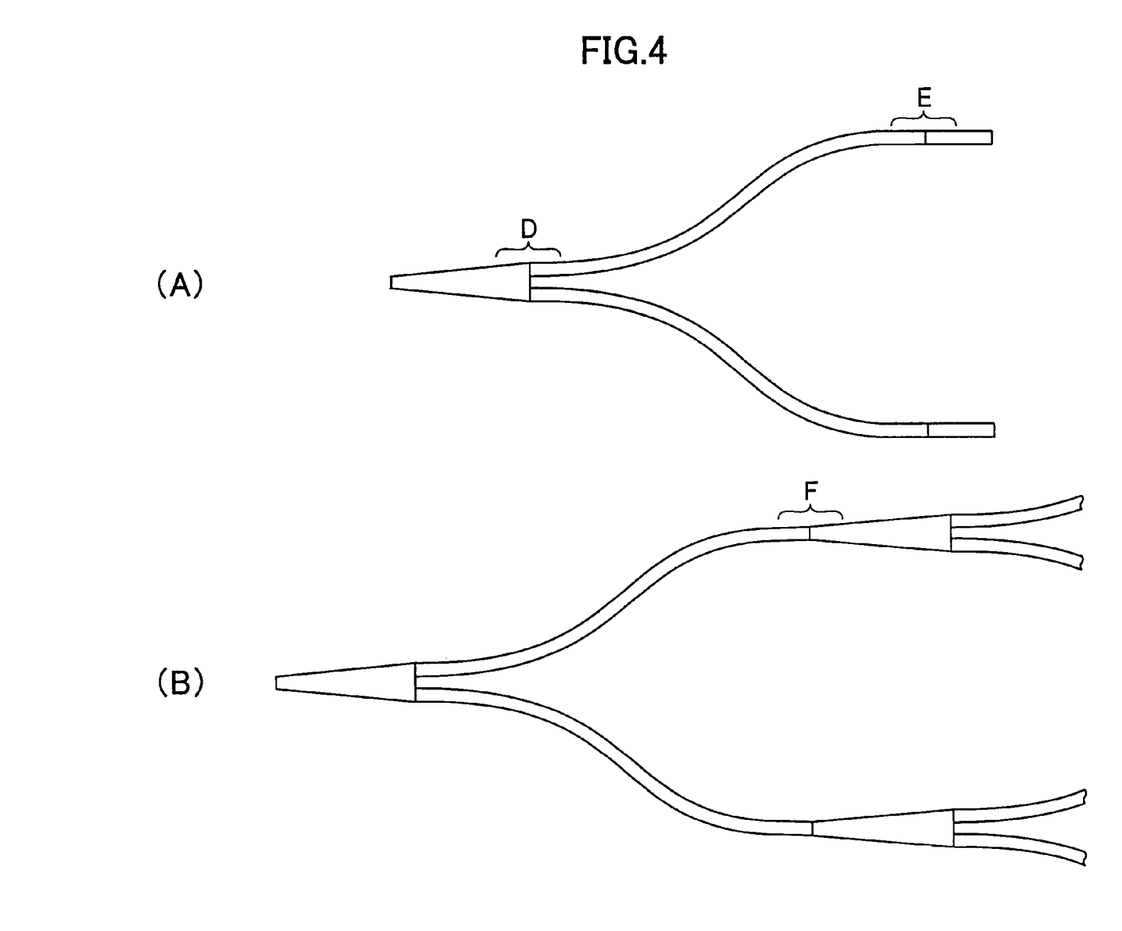
FIG. 4A is a diagram showing the connected portion of a sigmoidal curved optical waveguide and a linear optical waveguide, which constitute an optical splitter.
FIG. 4B is a diagram showing the connected portion of a sigmoidal curved optical waveguide and a branched optical waveguide, in an optical splitter.

By way of comparison, there was likewise prepared a conventional curved optical waveguide having an S-bent cosine-curved shape and a schematic structure as shown in FIG. 3. The quantities of the deviation between the geometrical center and optical center of the core observed at the both ends of the comparative curved optical waveguide were found to be identical and equal to 0.4 μm.

As has been described above, the optical waveguide of the present invention does not require the use of, at one end thereof, any axis-deviation structure. Such the axis-deviation structure is not preferred since optimum structure cannot easily be produced due to the influence of various factors such as the scatter of the structure encountered when producing the same and due to the fact that the axis-deviation structure may be determined depending on the refractive index difference between the core and clad, the dimension of the core and the wavelengths of light rays used. Moreover, the optical waveguide of the present invention shows excess optical losses almost identical to those observed for the curved portion of a conventional optical waveguide having an S-bent cosine-curved shape.

Example 2

Figure 6:
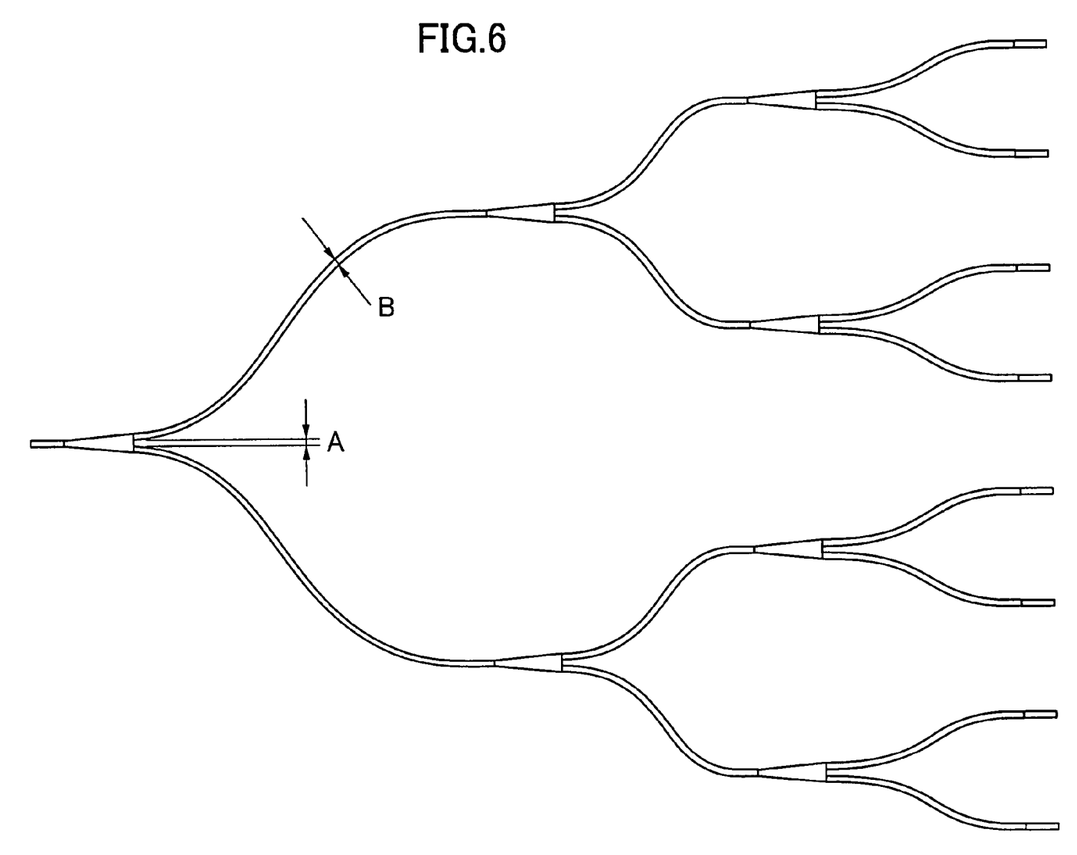
FIG. 6 is a diagram showing an embodiment of an optical splitter which comprises a curved optical waveguide according to the present invention incorporated therein.

Then the optical excess losses were likewise calculated for a 1×8 splitter having a structure as shown in FIG. 6. The excess loss was found to be −9.5 dB when the curved optical waveguides according to the present invention were used for the connection in this splitter, while the excess loss was found to be −10 dB when using S-shaped curved optical waveguides each having an arc-connected shape. In this connection, the branching width A and core width B appearing in FIG. 6 are as follows:

Branching Width A: 3.5 μm
Core Width B: 6.5 μm

Further, the excess loss was likewise calculated according to the beam-propagation method (BPM).

In addition, a mask carrying the foregoing core pattern was prepared according to the following method. The dimension of a core may vary during the manufacturing processes and therefore, a core pattern was drawn by the CAD technique while taking, into account, the predicted variable quantity therefor. In addition to the core pattern, there were added, to the mask, an alignment mark for improving the precision for positioning the mask and the substrate and other markers used for pattern-measurements. The CAD drawing is conducted as follows to improve the efficiency of these drawing operations: a pattern for one element is firstly drawn and then a copy of the foregoing pattern for one element is used to produce array of patterns till the whole surface of the mask is entirely occupied by such patterns. As methods for patterning one element, a layer may first be applied onto the CAD drawing, followed by drawing a desired core pattern thereon, and then another layer may then be applied thereon, followed by drawing another desired core pattern on the layer, in addition to the foregoing patterning. Then a mask pattern is directly transferred or drawn on a mask-forming substrate by the exposure thereof to light rays through the figure thus drawn according to the CAD technique using an exposure machine and then the patterned area is filled up with a Cr metal film to thus give a mask or the area other than the patterned area is filled up with a Cr metal film to thus give another mask. The foregoing two kinds of masks can properly be selected and used depending on the kinds of resists used in the core pattern-forming processes and/or the kinds of core-forming processes in the production of a desired optical waveguide.

As has been discussed above in detail, the 1×8 splitter produced using the curved optical waveguide according to the present invention was found to have an excess loss lower than that observed for the conventional splitter constituted using an S-shaped curved optical waveguide having an arc-connected shape.

Example 3

Figure 7:
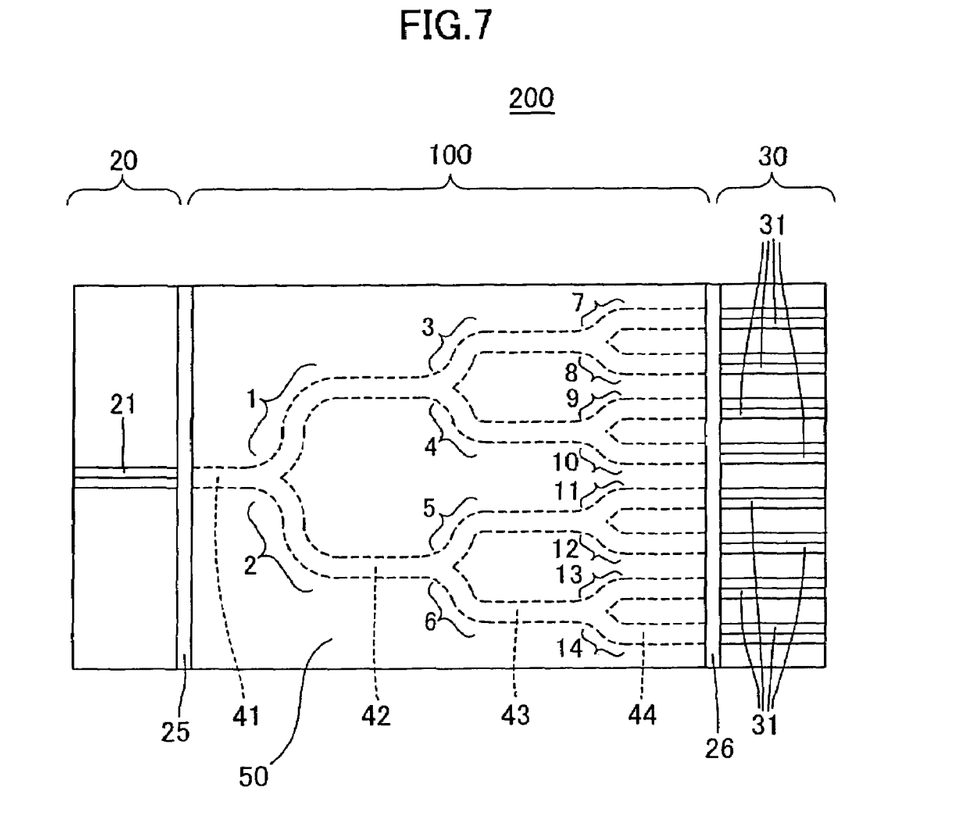
FIG. 7 is a diagram showing an embodiment of an optical splitter which comprises a curved optical waveguide according to the present invention incorporated therein.

The following materials were used to produce an optical splitter equipped with a curved optical waveguide having a schematic structure as shown in FIG. 7:

Core: OPI-N3205 available from Hitachi Chemical Co., Ltd.

Clad: OPI-N1005 available from Hitachi Chemical Co., Ltd.

Preparation Method: An organic zirconium chelate compound was applied onto a silicon wafer provided with V-shaped grooves formed thereon according to the spin-coating (whirling) technique to a thickness (determined after drying) of 100 Å, followed by drying the coated film, applying, onto the chelate film, a fluorine atom free-polyimide resin layer to a thickness (determined after drying) of 0.3 µm, drying the resin film, and the subsequent formation of a lower clad layer (8 µm) of a fluorine atom-containing polyimide resin and a core layer (6.5 µm). Then a silicon-containing resist was coated on the core layer to a thickness of 0.5 µm, followed by drying the same, and the resist layer was exposed to light rays through the mask prepared in Example 2 and carrying the core pattern, followed by the development of the light-exposed resist layer and the subsequent reactive ion etching thereof through the resulting resist pattern to thus form a desired core layer. After the removal of the resist film, an upper clad layer was formed (thickness: 151 µm) to thus complete a polyimide optical waveguide. Thereafter, the resulting polyimide optical waveguide was cut into individual optical waveguide tips through dicing.

The resulting optical waveguide was then inspected for the insertion loss. The evaluation or the measurement of the insertion loss was carried out by fixing an optical fibers while making use of the V-shaped grooves formed on the both ends of the waveguide as guide means. The light source used herein was a semiconductor laser capable of emitting light rays having a wavelength of 1.31 µm. As a result, the insertion losses, on the average, were found to be −10.6 dB (−10.8 dB for the port showing the highest insertion loss) for an optical waveguide assembled using the curved optical waveguide of the present invention; and −11.2 dB (−11.7 dB for the port showing the highest insertion loss) for an optical waveguide assembled using an S-shaped curved optical waveguide having an arc-connected shape.

As has been described above in detail, the splitter having a 1×8 type structure assembled using the curved optical waveguide of the present invention was found to have an insertion loss significantly lower than that observed for the optical waveguide assembled using an S-shaped curved optical waveguide having an arc-connected shape.

Furthermore, in the foregoing Examples, an optical waveguide used as a splitter was completely assembled using the curved optical waveguide of the present invention as all of the S-shaped curved optical waveguide portions included in the splitter, but it was also possible to use the curved optical waveguides of the present invention and other S-shaped curved optical waveguides in combination for the assembly of such a splitter.

The S-shaped curved optical waveguide of the present invention can be connected, on one end thereof, with a linear optical waveguide without causing any axial deviation at a low coupling loss and can be connected, on the other end thereof, with a curved optical waveguide having the same curvature without causing any axial deviation to thus assemble a desired optical waveguide. In addition, the S-shaped curved optical waveguide of the present invention can be connected, on one end thereof, with a linear optical waveguide without causing any axial deviation at a low coupling loss and it can likewise be connected, on the other end thereof, with another linear optical waveguide in such a manner that the geometrical center of the optical waveguide core axially deviates from the mode center of the transmitting light, to thus give a desired optical waveguide.

In respect of the connection of the curved optical waveguide of the present invention, the end of the optical waveguide, whose curvature is zero, can suitably be connected not only to a linear optical waveguide, but also to coupling portion (in case of 1×2 branching type one, on the 1 ch side) of a branched structure such as an optical splitter. The product tolerance of such a connected portion thus assembled using the curved optical waveguide of the present invention does not widely vary as compared with those observed for the corresponding portion assembled using a conventional curved optical waveguide requiring certain axis-deviation and accordingly, a desired optical waveguide can be produced at a good yield. Moreover, the present invention likewise permits the preparation of an optical waveguide which can exhibit excellent characteristic properties over a considerably wide wavelength range.

On the other hand, regarding the connection of the curved optical waveguide of the present invention, the end of the optical waveguide, whose curvature is finite, can suitably be used not only in the connection with a curved optical waveguide, but also with the portion (in case of 1×2 branched type one, on the 2 ch side) of an optical splitter having a branched structure and it may be used in a directional coupler. In this connected portion, the quantity of light leaked out through the center of the base of the branched portion can be reduced even when the distance between the branches at the base of the branched portion (or the distance of the portion having a small width) is set at a finite level and this in turn permits the reduction of any excess optical loss at the branched portion.

What is claimed is:

1. A curved optical waveguide which is free of any axis-deviation structure in the middle of the waveguide and which has a sigmoidal core shape, wherein the curvature thereof at one end is zero and the curvature thereof at the other end is finite (>0).

2. The curved optical waveguide as set forth in claim 1, wherein the shape of the core thereof is defined by the following equation (1):

$$y = \frac{1}{\left(f(1) + \frac{2}{3\pi}\right)}\left[\frac{2}{3\pi}\left\{1 - \sin\left[\frac{\pi}{2}(3z+1)\right]\right\} + f(z)\right] \quad (1)$$

wherein, y and z represent coordinate axes perpendicular to one another in a plane on which the optical waveguide is positioned; f(z) is a continuous function of z and satisfies the following relations: f(0) =0, f'(0)=0, f"(0) =0, f(1) ≠2/3π, f'(1) =1, and f"(1) =0; f'(z) is the first differential of the function f(z) with z; and f"(z) is the second differential of the function f(z) with z.

3. The curved optical waveguide as set forth in claim 2, wherein the shape of the core thereof is defined by the following equation (2):

$$y = \frac{1}{\frac{1}{2} + \frac{2}{3\pi}}\left[\frac{z}{2} + \frac{2}{3\pi} - \frac{2}{3\pi}\sin\left[\frac{\pi}{2}(3z+1)\right] - \frac{1}{2\pi}\sin[\pi z]\right]. \quad (2)$$

4. The curved optical waveguide as set forth in claim 1, wherein the core and/or the clad are partially or completely prepared from polymers.

5. The curved optical waveguide as set forth in claim 4, wherein the polymer is a fluorine atom-containing polyimide resin.

6. An optical device comprising a curved optical waveguide as set forth in claim 1.

7. The optical device as set forth in claim 6, wherein it is a directional coupler.

8. The optical device as set forth in claim 6, wherein it is an optical splitter.

9. A mask used for the production of a curved optical waveguide which is free of any axis-deviation structure in the middle of the waveguide and which has a sigmoidal core shape, wherein the curvature thereof at one end is zero and the curvature thereof at the other end is finite (>0).

10. The mask as set forth in claim 9, wherein the shape thereof is represented by the following equation (1):

$$y = \frac{1}{\left(f(1) + \frac{2}{3\pi}\right)}\left[\frac{2}{3\pi}\left\{1 - \sin\left[\frac{\pi}{2}(3z+1)\right]\right\} + f(z)\right] \quad (1)$$

wherein, y and z represent coordinate axes perpendicular to one another in a plane on which the optical waveguide is positioned; f(z) is a continuous function of z and satisfies the following relations: f(0) =0, f '(0) =0, f"(0) =0, f(1)≠2/3π, f'(1) =1, and f"(1) =0; f'(z) is the first differential of the function f(z) with z; and f"(z) is the second differential of the function f(z) with z.

11. The mask as set forth in claim 10, wherein the shape of the core thereof is defined by the following equation (2):

$$y = \frac{1}{\frac{1}{2} + \frac{2}{3\pi}}\left[\frac{z}{2} + \frac{2}{3\pi} - \frac{2}{3\pi}\sin\left[\frac{\pi}{2}(3z+1)\right] - \frac{1}{2\pi}\sin[\pi z]\right]. \quad (2)$$

12. A method for preparing a curved optical waveguide characterized by the use of a mask as set forth in claim 9.

13. The optical device as set forth in claim 6, having linear optical waveguides positioned at both ends of said curved optical waveguide, with an axis-deviation structure only at one end of the curved optical waveguide.

14. The curved optical waveguide as set forth in claim I, wherein the curvature thereof at one end is zero on a side thereof to be connected to a branching member.

15. The optical device as set forth in claim 6, wherein said curved optical waveguide is connected, at its end having the curvature of zero, with a linear optical waveguide or with a coupled portion of a branched structure.

16. The optical device as set forth in claim 6, wherein said curved optical waveguide is connected, at its end having the finite curvature, with a curved optical waveguide or with a branched portion of a branched structure.

* * * * *